United States Patent
Statton et al.

[15] 3,674,715
[45] July 4, 1972

[54] SOLID SOLUBLE POLYMERS FROM 4-VINYLCYCLOHEXENE DIEPOXIDE

[72] Inventors: Gary L. Statton, Wallingford, Pa.; Richard W. Sauer, Cherry Hill, N.J.

[73] Assignee: Atlantic Richfield Company, New York, N.Y.

[22] Filed: Oct. 1, 1970

[21] Appl. No.: 77,351

[52] U.S. Cl. ..........................260/2 EP, 117/123, 117/161, 161/184, 260/2 EC, 260/29.2 EP, 260/30.4, 260/32.8, 260/33.6
[51] Int. Cl. ..........................................................C08g 43/00
[58] Field of Search......................................260/2 EP, 2 EC

[56] References Cited

UNITED STATES PATENTS 3,441,522   4/1969   Soldatos et al..........................260/2 N
3,577,386   5/1971   Maier ...................................260/2 EC

*Primary Examiner*—Harry Wong, Jr.
*Attorney*—Robert R. Cochran and Ernest G. Posner

[57] ABSTRACT

Soluble solid easily handled polyepoxide polymers can be formed from 4-vinylcyclohexene diepoxide in a catalytic process using a tertiary amine and an active hydrogen containing compound. The powdery polymers of the invention can be easily cured to thermoset resins using coreagents to form castings, laminates, and coatings having exceptional toughness and good strength.

10 Claims, No Drawings

SOLID SOLUBLE POLYMERS FROM 4-VINYLCYCLOHEXENE DIEPOXIDE

PRIOR ART

The prior art teaches the cured thermoset polymers are useful in forming castings, laminates, and coatings. However, in order for said polymers to be useful for the production of these coatings it is desirable that a solid, thermoplastic, fuseable, soluble product be formed at some intermediate stage of the polymerization reaction. This product can then be homogeneously and uniformly applied to the articles to be coated and thereafter infusibilized and insolubilized by curing. One problem encountered with many of the diepoxides is that cross-linking occurs simultaneously with linear polymerization, thereby eliminating any intermediate product which would be soluble; hence, leaving the operator with a one step process of simultaneous polymerization and coating or molding. The art shows the polymers of 4-vinylcyclohexene diepoxide have been prepared using various catalysts such as boron trifluoride-butanol systems and polymerization in the presence of perchloric acid. U.S. Pat. No. 3,441,522 (1969) to Soldatos, et al. discloses the production of curable tacky polymers of polyepoxides, including 4-vinylcyclohexene diepoxide. While tacky polymers may have some advantages in the production of filament would structures and impregnating glass filaments, as pointed out in Soldatos, et al, these intermediate tacky polymers are not easily stored nor is a tacky intermediate product generally desirable for handling in most processes. Soldatos teaches that 1.3 to 39% water by weight of 4-vinylcyclohexene diepoxide is used to produce the tacky polymer.

OBJECTIVES

The objective of this invention is to provide powdery solid soluble polymers of 4-vinylcyclohexene diepoxide.

A further object is to produce polymers which are easily handled and stable for storage.

Another objective is to produce powdery solid soluble polymers of 4-vinylcyclohexene diepoxide which may be easily placed in solution and cross-linked to give insoluble products useful in such applications as coatings, varnishes, laminating resins and molding compounds.

DESCRIPTION OF THE INVENTION

We have discovered that solid polymers of 4-vinylcyclohexene diepoxide can be prepared in the presence of a tertiary amine and an active hydrogen-containing compound catalyst system. By controlling the amount of the catalyst present and the reaction temperature, it is believed that the catalyst system selectively polymerizes the terminal epoxide group, resulting in polymers having the majority of its repeating units typified by the following formula:

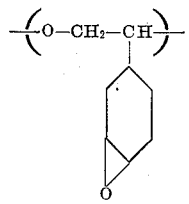

The tertiary amine is used in a catalytic amount sufficient to initiate polymerization. This is generally in the amount of 0.1 to 25% by weight based on the weight of the 4-vinylcyclohexene diepoxide and more preferably 1 to 5% based on the weight of the 4-vinylcyclohexene diepoxide. Suitable tertiary amines include the aliphatic amines, such as triethyl amine, trimethyl amine, dimethyl-n-propylamine and the like, aliphatic aryl amines such as benzyldimethyl amine and N-N-dimethyl analine and tertiary aliphatic diamines such as triethylene diamine and N-N-tetramethyl-ethylene-diamine.

The active hydrogen containing compound may consist of water, hydrogen sulfide, alcohols, polyols, or mercaptans and is used in amounts of 0.01 to 1.0% by weight based on the weight of 4-vinylcyclohexene diepoxide. Preferably, the active hydrogen compound is present in amounts of 0.05 to 0.8 % by weight of the vinylcyclohexene diepoxide.

Suitable alcohols consist of aliphatic or cycloaliphatic alcohols having up to about 12 carbon atoms, such as methyl alcohol, isopropyl alcohol, n-octyl alcohol, dodecyl alcohol, cyclohexanol, cyclobutanol, etc. Likewise, the mercaptans suitable for use in the invention include those having up to about 12 carbon atoms, including methyl mercaptan, isopropylmercaptan and decyl mercaptan. Polyols can include those having a molecular weight up to 3,000, including ethylene glycol, glycerol, propylene glycol and the poly oxy propylene diols and triols.

Generally, the polymerization can be conducted over a wide range of temperatures from about 0° C. to about 250° C. A particularly preferred range is from about 10° to 120° C. The polymerization can be conducted under atmospheric, subatmospheric or superatmospheric pressures.

In addition, organic solvents as aromatics such as benzene and toluene, and ketones such as acetone, methyl ethyl ketone and cyclohexanone and tetrahydrofuran can be used in the polymerization although the latter tends to result in polymers having lower epoxide functionality.

Recovery of the soluble, powdery solid 4-vinylcyclohexene diepoxide polymers from the reaction mixture can be conveniently accomplished by precipitation with anti solvents such as water or hexane, followed by vacuum drying.

The powdery solid polymers obtained through practice of this invention can be easily placed in solution by dissolving the polymer in a suitable organic solvent. Examples of such solvents include ketones such as methyl ethyl ketone and diisopropyl ketone, aromatic hydrocarbons such as benzene and toluene, ethers such as diethylether and tetrahydrofuran and monomeric 4-vinylcyclohexene dieposide. Once in solution the polymers can be cured by diepoxide. addition of Lewis acids or basis, particularly organic anhydrides, acids and organic amines which result in cross-linking to provide the cured products.

The following examples further illustrate the present invention and are not intended to limit the scope thereof in any manner.

EXAMPLE 1

4-Vinylcyclohexene diepoxide in the amount of 225 grams was weight into a polymerization bottle. Trimethyl amine (5.6 g; 2.5% by wt.) and 0.45g of water (0.2% by wt.) were added and the mixture was polymerized at 90° C. for 24 hours with tumbling. The polymerized mixture analyzed 4.5 milliequivalents of epoxide per gram and the conversion to polymer was 88%. The mixture was dissolved in benzene and precipitated in hexane and dried under vacuum yielding a fine powdery polymer with an inherent viscosity of 0.11 (0.2 g in benzene).

EXAMPLE 2

4-vinylcyclohexene diepoxide in the amount of 22.5 g; 0.05 g of water and 0.56 g of trimethyl amine were charged into a polymerization bottle. After polymerization at 90° C. for 24 hours, analysis indicated conversion of monomer was 65%. The polymerization mixture was mechanically broken up in water yielding a powdery light colored polymer having 3.9 milliequivalents of epoxide per gram.

EXAMPLE 3

4-Vinylcyclohexene diepoxide in the amount of 225 grams, 270 ml. of dried cyclohexanone, 0.45 g of water and 5.66 g of trimethyl amine were charged into a polymerization bottle. After polymerizing at 90° C. for 24 hours, analysis indicated that monomer conversion was 99%. After precipitation in water and vacuum drying, the resulting light brown solid polymer analyzed for 0.66 milliequivalents of epoxide per gram of polymer.

EXAMPLE 4

4-Vinylcyclohexene diepoxide in the amount of 225 g, 0.45 g of water and 5.66 g of trimethyl amine were charged into a polymerization bottle. The bottle was allowed to set for 6 days at room temperature during which time the viscosity increased, yielding a semi solid. Tetrahydrofuran in the amount of 135 ml. was stirred into the polymer mixture and the polymer was precipitated in water from the THF solution yielding a light brown powdery solid polymer which analyzed for 2.2 milliequivalents of epoxide per gram.

We claim:

1. A process comprising the polymerization of 4-vinylcyclohexene diepoxide in the presence of a tertiary amine and an active hydrogen-containing compound catalyst system; said amine being present in an amount of 0.1 to 25% by weight based on the diepoxide and wherein said active hydrogen-containing compound being selected from the group consisting of water, hydrogen sulfide, alcohols, polyols, or mercaptans is present in an amount of 0.01 to 1.0% by weight based on the diepoxide; and separating the copolymer produced by precipitation with an anti-solvent followed by vacuum drying wherein said product is a powdery solid copolymer soluble in organic solvents selected from the group consisting of acetone, methylethyl ketone, benzene, toluene, tetrahydrofuran and monomeric vinylcyclohexene diepoxide.

2. The process of claim 1 wherein said amine is present in an amount up to 5% by weight based on the diepoxide.

3. The process of claim 1 wherein said active hydrogen containing compound is present in an amount of 0.05 to 0.8% by weight of the diepoxide.

4. The process of claim 1 wherein the active hydrogen containing compound is selected from the group consisting of alcohols having up to 12 carbon atoms, mercaptans having up to 12 carbon atoms, polyols having a molecular weight up to 3,000, water and hydrogen sulfide.

5. The process of claim 1 wherein the active hydrogen containing compound is water.

6. The process of claim 1 wherein the polymerization is carried out at atmospheric pressure and between 0° and 250° C.

7. The process of claim 6 wherein the polymerization is carried out between 10° and 120° C.

8. The process of claim 1 wherein the polymerization takes place in a solvent medium selected from the group consisting of benzene, toluene, acetone, methyl ethyl ketone, cyclohexanone and tetrahydrofuran.

9. The process of claim 1 wherein the catalyst system consists essentially of trimethyl amine and water and wherein water is used as the anti solvent for precipitating out the copolymer.

10. Solid powdery linear polyepoxide polymers of 4-vinylcyclohexene diepoxide which are thermosetable and wherein the majority of the repeating units are typified by the formula

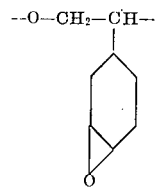

and produced by the process of claim 1.

* * * * *